(12) United States Patent
Sasaki

(10) Patent No.: US 8,868,853 B2
(45) Date of Patent: Oct. 21, 2014

(54) DATA PROCESSING DEVICE, DATA RECORDING METHOD AND DATA RECORDING PROGRAM

(75) Inventor: Shigero Sasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 366 days.

(21) Appl. No.: 13/390,030

(22) PCT Filed: Aug. 10, 2010

(86) PCT No.: PCT/JP2010/063523
§ 371 (c)(1),
(2), (4) Date: Feb. 10, 2012

(87) PCT Pub. No.: WO2011/019029
PCT Pub. Date: Feb. 17, 2011

(65) Prior Publication Data
US 2012/0173801 A1 Jul. 5, 2012

(30) Foreign Application Priority Data
Aug. 12, 2009 (JP) .................................. 2009-187229

(51) Int. Cl.
*G06F 13/00* (2006.01)
*G06F 13/28* (2006.01)
*G06F 3/06* (2006.01)

(52) U.S. Cl.
CPC ............ *G06F 3/0665* (2013.01); *G06F 3/0685* (2013.01); *G06F 3/0613* (2013.01); *G06F 3/0644* (2013.01)
USPC ........... 711/154; 711/170; 711/103; 711/112; 711/E12.008

(58) Field of Classification Search
CPC ..................................................... G06F 3/0629
See application file for complete search history.

(56) References Cited

U.S. PATENT DOCUMENTS 5,802,593 A * 9/1998 Grimsrud ...................... 711/165
5,845,061 A 12/1998 Miyamoto et al.
(Continued)

FOREIGN PATENT DOCUMENTS

JP 8-153014 A 6/1996
JP 2000-003309 A 1/2000
(Continued)

OTHER PUBLICATIONS

Graefe, G., "The Five-minute Rule 20 Years Later: and How Flash Memory Changes the Rules", Queue 6, 4 (Jul. 2008), 40-52, http://doi.acm.org/10.1145/1413254.1413264.

(Continued)

*Primary Examiner* — Eric S Cardwell
(74) *Attorney, Agent, or Firm* — Sughrue Mion, PLLC

(57) ABSTRACT

A data processing device has plural kinds of recording media and a data block management device. The data block management device classifies data blocks into plural groups and records each group on an appropriate recording medium. The data block management device has a memory unit, a group reconfiguration unit and a medium selection unit. Access trend information representing a trend of combinations of former groups and latter groups is stored in the memory unit. The group reconfiguration unit performs group reconfiguration processing by reference to the access trend information. Specifically, if a sequential access trend between two different groups is increased, they are integrated to generate a new group. If a sequential access trend within a certain group is decreased, the certain group is divided to generate a new group. The medium selection unit records the new group obtained as a result of the group reconfiguration on a corresponding recording medium.

13 Claims, 16 Drawing Sheets

(56) References Cited

U.S. PATENT DOCUMENTS

| | | | |
|---|---|---|---|
| 5,920,896 A * | 7/1999 | Grimsrud et al. | 711/165 |
| 2003/0014603 A1* | 1/2003 | Sasaki et al. | 711/158 |
| 2010/0115206 A1* | 5/2010 | de la Iglesia et al. | 711/137 |

FOREIGN PATENT DOCUMENTS

| JP | 2000-322315 A | 11/2000 |
|---|---|---|
| JP | 2006-018591 A | 1/2006 |
| JP | 2007-065743 A | 3/2007 |
| JP | 2007-193440 A | 8/2007 |
| JP | 2007-293440 A | 11/2007 |
| JP | 2008-046964 A | 2/2008 |
| JP | 2008-242503 A | 10/2008 |
| JP | 2008-310793 A | 12/2008 |
| JP | 2009-157441 A | 7/2009 |

OTHER PUBLICATIONS

Dumitru, D. "Understanding Flash SSD Performance", http://www.storagesearch.com/easyco-flashperformance-art.pdf, Aug. 16, 2007.
International Search Report issued Sep. 21, 2010 in PCT/JP2010/063523.

* cited by examiner

Fig. 1
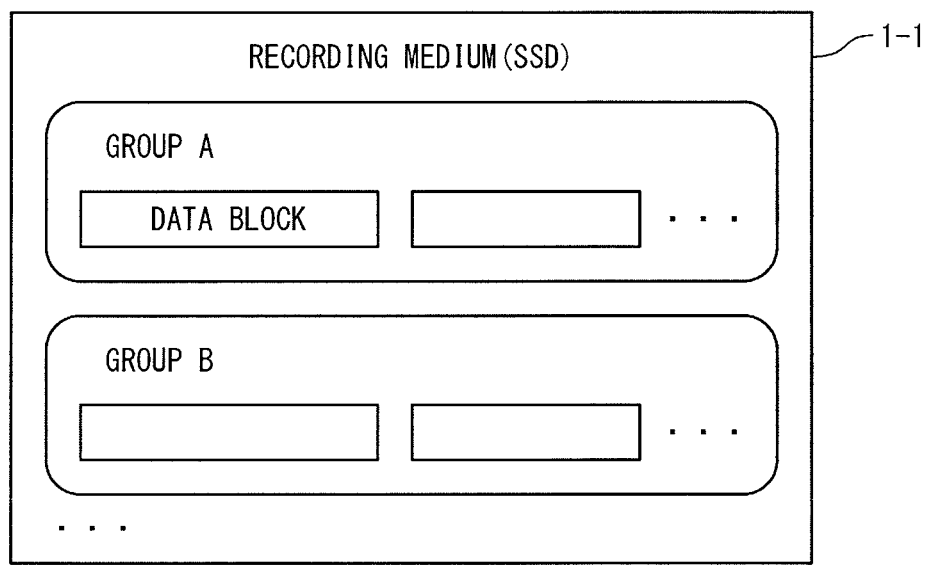
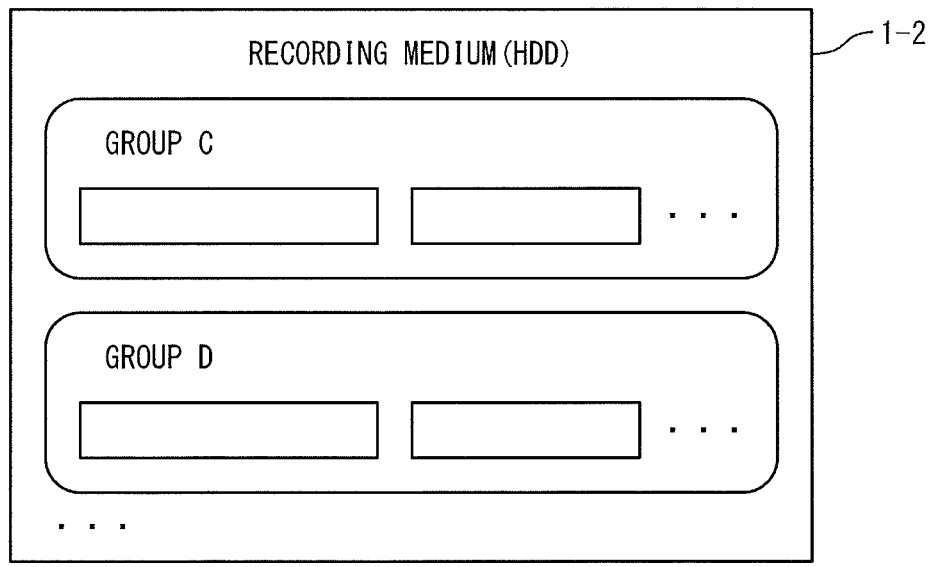

Fig. 3

ACCESS GROUP HISTORY INFORMATION HIS

|   | GROUP | NUMBER OF ACCESSES |
|---|---|---|
| 1 | B | 12 |
| 2 | D | 300 |
| 3 | A | 3 |
| 4 | B | 1 |
| 5 | A | 7 |

BEGINNING POSITION : 4

NUMBER OF ENTRIES NOT YET REFLECTED : 3

Fig. 4

ACCESS TREND INFORMATION TND

| FORMER GROUP | LATTER GROUP | NUMBER OF TIMES |
|---|---|---|
| A | A | |
| A | B | |
| A | C | |
| A | others | |
| B | A | |
| B | B | |
| ⋮ | ⋮ | ⋮ |

Fig. 13

ACCESS TREND INFORMATION TND

| FORMER GROUP | LATTER GROUP | NUMBER OF TIMES |
|---|---|---|
| A | A | 45 |
| A | B | 5 |
| A | others | 3 |
| ⋮ | ⋮ | ⋮ |

ACCESS GROUP HISTORY INFORMATION HIS

Fig. 15

ACCESS TREND INFORMATION TND

| FORMER GROUP | LATTER GROUP | NUMBER OF TIMES |
|---|---|---|
| A | A | 48 |
| A | B | 6 |
| A | others | 3 |
| ⋮ | ⋮ | ⋮ |

Fig. 16

ACCESS TREND INFORMATION TND

| FORMER GROUP | LATTER GROUP | NUMBER OF TIMES |
|---|---|---|
| E | E | |
| E | others | |
| ⋮ | ⋮ | ⋮ |
| C | E | |
| ⋮ | ⋮ | ⋮ |

.# DATA PROCESSING DEVICE, DATA RECORDING METHOD AND DATA RECORDING PROGRAM

CROSS REFERENCE TO RELATED APPLICATIONS

This application is a National Stage of International Application No. PCT/JP2010/063523, filed on Aug. 10, 2010, which claims priority from Japanese Patent Application No. 2009-187229 filed on Aug. 12, 2009, the contents of all of which are incorporated herein by reference in their entirety.

TECHNICAL FIELD

The present invention relates to a technique that records a data on an appropriate one of plural kinds of recording media.

BACKGROUND ART

A typical recording medium used as a secondary storage device in a computer system is a hard disk drive (HDD: Hard Disk Drive). In recent years, a solid state drive (SSD: Solid State Drive) based on a semiconductor memory also is used. The HDD and the SSD have different characteristics in terms of cost per unit capacity, performance and power consumption. In general, the cost per unit capacity of the HDD is lower than that of the SSD, and the performance and power consumption of the SSD are superior to those of the HDD (Non Patent Literature 1: Graefe, G., "The Five-minute Rule 20 Years Later: and How Flash Memory Changes the Rules", Queue 6, 4 (July 2008), 40-52, refer to http://doi.acm.org/10.1145/1413254.1413264).

Moreover, the performance of the SSD and the HDD varies greatly depending on products. For example, there are two types for the SSD; a single level cell (SLC) with high performance and a multi-level cell (MLC) with low performance. The performance of the HDD strongly depends on a rotational speed and a seek time of a disk. In general, products with higher performance tend to be higher in the cost or the cost per unit capacity. More detailed performance of the recording media is described in Non Patent Literature 2 (Dumitru, D., "Understanding Flash SSD Performance", http://www.storagesearch.com/easyco-flashperformance-art.pdf).

In this manner, there are various types of recording media and those characteristics are different from each other. Existing techniques related to usage of the various types of recording media will be described below.

Patent Literature 1 (Japanese Patent Publication JP-2006-18591) discloses a memory card that has a high-capacity flash memory with a large write data unit and a low-capacity flash memory with a small write data unit. At writing of a data whose size is less than a page size of the high-capacity flash memory, the said data is written to the low-capacity flash memory.

Patent Literature 2 (Japanese Patent Publication JP-2008-242503) discloses a storage device that has a high-speed SLC flash memory and a low-speed but high-capacity MLC flash memory. A frequently-accessed data is written to the high-speed SLC flash memory.

Patent Literature 3 (Japanese Patent Publication JP-2008-310793) discloses a memory device that has a high-speed SLC flash memory and a low-speed but high-capacity MLC flash memory. The high-speed SLC flash memory is allocated to a head space of a memory region, in which data management information of a file system is stored.

Patent Literature 4 (Japanese Patent Publication JP-2007-193440) discloses a memory device that has an HDD and a nonvolatile cache memory. When receiving a command instructing data write, a state determination unit checks a rotational state of the HDD. If the HDD is in a rotating state, a data is written to the HDD. If the HDD is not in the rotating state, a data is written to the nonvolatile cache memory.

Patent Literature 5 (Japanese Patent Publication JP-2007-293440) discloses a memory device that has an HDD and a flash memory. In a case of a predetermined command for write through that instructs writing of a data to a plurality of media, the data is written to both of the HDD and the flash memory.

Patent Literature 6 (Japanese Patent Publication JP-2008-46964) discloses an information recording device that has an HDD, a flash memory and an SDRAM operating higher than the flash memory. The flash memory and SDRAM both are used as cache memories for the HDD. If there is currently no free space of a size of a write data but expected to be formed before long, the information recording device determines which is faster to write the said write data to the SDRAM or to the flash memory. Then, the said write data is written to the one determined to be faster.

Patent Literature 7 (Japanese Patent Publication JP-2000-3309) discloses a memory device that has a cache control unit, an access type determination unit and a buffer configuration control unit: When receiving a write access from an upper-layer device, the cache control unit loads a write data into a data buffer region of a memory, notifies the upper-layer device of successful completion, and then writes the write data loaded in the data buffer region to a recording medium. The access type determination unit analyzes whether the write access from a host is a sequential access or a random access. The buffer configuration control unit selects, depending on the access type, a data buffer configuration with an optimum number of sections and performs an cache operation.

Patent Literature 8 (Japanese Patent Publication JP-2007-65743) discloses a mobile information terminal that has an HDD and a buffer memory. A memory region of the buffer memory is clearly divided into a first region for use in storing sequential data such as audio data and a second region for use in storing random access data such as address files. The random access data is always recorded on the second region.

As another related technique, Patent Literature 9 (Japanese Patent Publication JP-2000-322315) discloses a method of managing data. According to the method, data objects in object heap are organized based on an access relationship between the data objects (e.g. based on temporal accessibility or relative frequency of accesses). As a result, data objects that are closely and successively accessed are arranged in the same page and thus are more likely to be arranged in the same cache line.

CITATION LIST

Patent Literature

[Patent Literature 1] Japanese Patent Publication JP-2006-18591
[Patent Literature 2] Japanese Patent Publication JP-2008-242503
[Patent Literature 3] Japanese Patent Publication JP-2008-310793
[Patent Literature 4] Japanese Patent Publication JP-2007-193440

[Patent Literature 5] Japanese Patent Publication JP-2007-293440
[Patent Literature 6] Japanese Patent Publication JP-2008-46964
[Patent Literature 7] Japanese Patent Publication JP-2000-3309
[Patent Literature 8] Japanese Patent Publication JP-2007-65743
[Patent Literature 9] Japanese Patent Publication JP-2000-322315

Non Patent Literature

[Non Patent Literature 1] Graefe, G., "The Five-minute Rule 20 Years Later: and How Flash Memory Changes the Rules", Queue 6, 4 (July 2008), 40-52, http://doi.acm.org/10.1145/1413254.1413264.
[Non Patent Literature 2] Dumitru, D., "Understanding Flash SSD Performance", http://www.storagesearch.com/easyco-flashperformance-art.pdf.

SUMMARY OF INVENTION

The inventor of this application has recognized the following point. In a case where plural kinds of recording media are used, the recording medium on which a data is recorded creates a big difference in access efficiency thereafter. For example, let us consider a case where an HDD capable of efficiently handling sequential accesses and an SSD capable of efficiently handling random accesses are used. In this case, randomly-accessed data should be recorded on the SSD and sequentially-accessed data should be recorded on the HDD. However, in a case where data access pattern is unknown or varies, it is not possible to determine which recording medium should be selected.

An object of the present invention is to provide a technique that can improve an access efficiency when plural kinds of recording media are used.

In an aspect of the present invention, a data processing device is provided. The data processing device has plural kinds of recording media and a data block management device. The data block management device classifies data blocks recorded on the plural kinds of recording media into a plurality of groups and records each of the plurality of groups on a corresponding one of the plural kinds of recording media. Here, regarding two successive accesses to the plural kinds of recording media, a former group is defined as a group to which a data block accessed first belongs, and a latter group is defined as a group to which a data block accessed next belongs. The data block management device has a memory unit, a group reconfiguration unit and a medium selection unit. Access trend information representing a trend of combinations of the former group and the latter group is stored in the memory unit. The group reconfiguration unit performs group reconfiguration processing by reference to the access trend information. In the group reconfiguration processing, if a first parameter representing a trend of sequential access between two different groups exceeds a first threshold value, the group reconfiguration unit integrates the two different groups to generate a new group. If a second parameter representing a trend of sequential access within a certain group falls below a second threshold value, the group reconfiguration unit divides the certain group to generate a new group. The medium selection unit records the new group obtained as a result of the group reconfiguration processing on a corresponding one of the plural kinds of recording media.

In another aspect of the present invention, a method of recording data on plural kinds of recording media is provided. The data recording method includes: (A) a step of classifying data blocks recorded on the plural kinds of recording media into a plurality of groups; (B) a step of recording each of the plurality of groups on a corresponding one of the plural kinds of recording media; (C) a step of performing group reconfiguration processing; and (D) a step of recording a new group obtained as a result of the group reconfiguration processing on a corresponding one of the plural kinds of recording media. Here, regarding two successive accesses to the plural kinds of recording media, a former group is defined as a group to which a data block accessed first belongs, and a latter group is defined as a group to which a data block accessed next belongs. The above-mentioned group reconfiguration processing includes: (C1) a step of reading access trend information representing a trend of combinations of the former group and the latter group, from a memory device; (C2) a step of referring to the access trend information and, if a first parameter representing a trend of sequential access between two different groups exceeds a first threshold value, integrating the two different groups to generate the new group; and (C3) a step of referring to the access trend information and, if a second parameter representing a trend of sequential access within a certain group falls below a second threshold value, dividing the certain group to generate the new group.

In still another aspect of the present invention, a data recording program that causes a computer to execute data recording processing for plural kinds of recording media is provided. The data recording processing includes: (A) a step of classifying data blocks recorded on the plural kinds of recording media into a plurality of groups; (B) a step of recording each of the plurality of groups on a corresponding one of the plural kinds of recording media; (C) a step of performing group reconfiguration processing; and (D) a step of recording a new group obtained as a result of the group reconfiguration processing on a corresponding one of the plural kinds of recording media. Here, regarding two successive accesses to the plural kinds of recording media, former group is defined as a group to which a data block accessed first belongs, and a latter group is defined as a group to which a data block accessed next belongs. The above-mentioned group reconfiguration processing includes: (C1) a step of reading access trend information representing a trend of combinations of the former group and the latter group, from a memory device; (C2) a step of referring to the access trend information and, if a first parameter representing a trend of sequential access between two different groups exceeds a first threshold value, integrating the two different groups to generate the new group; and (C3) a step of referring to the access trend information and, if a second parameter representing a trend of sequential access within a certain group falls below a second threshold value, dividing the certain group to generate the new group.

According to the present invention, it is possible to improve an access efficiency when plural kinds of recording media are used.

BRIEF DESCRIPTION OF DRAWINGS

The above and other objects, advantages and features of the present invention will be more apparent from the following description of certain exemplary embodiments taken in conjunction with the accompanying drawings.

FIG. 1 is a conceptual diagram showing plural kinds of recording media.

FIG. 3 shows an example of access group history information according to the present exemplary embodiment.

FIG. 4 shows an example of access trend information according to the present exemplary embodiment.

FIG. 13 shows an example of the access trend information.

FIG. 15 shows the access trend information after update.
FIG. 16 shows the access trend information after group integration processing.

DESCRIPTION OF EMBODIMENTS

Figure 2:
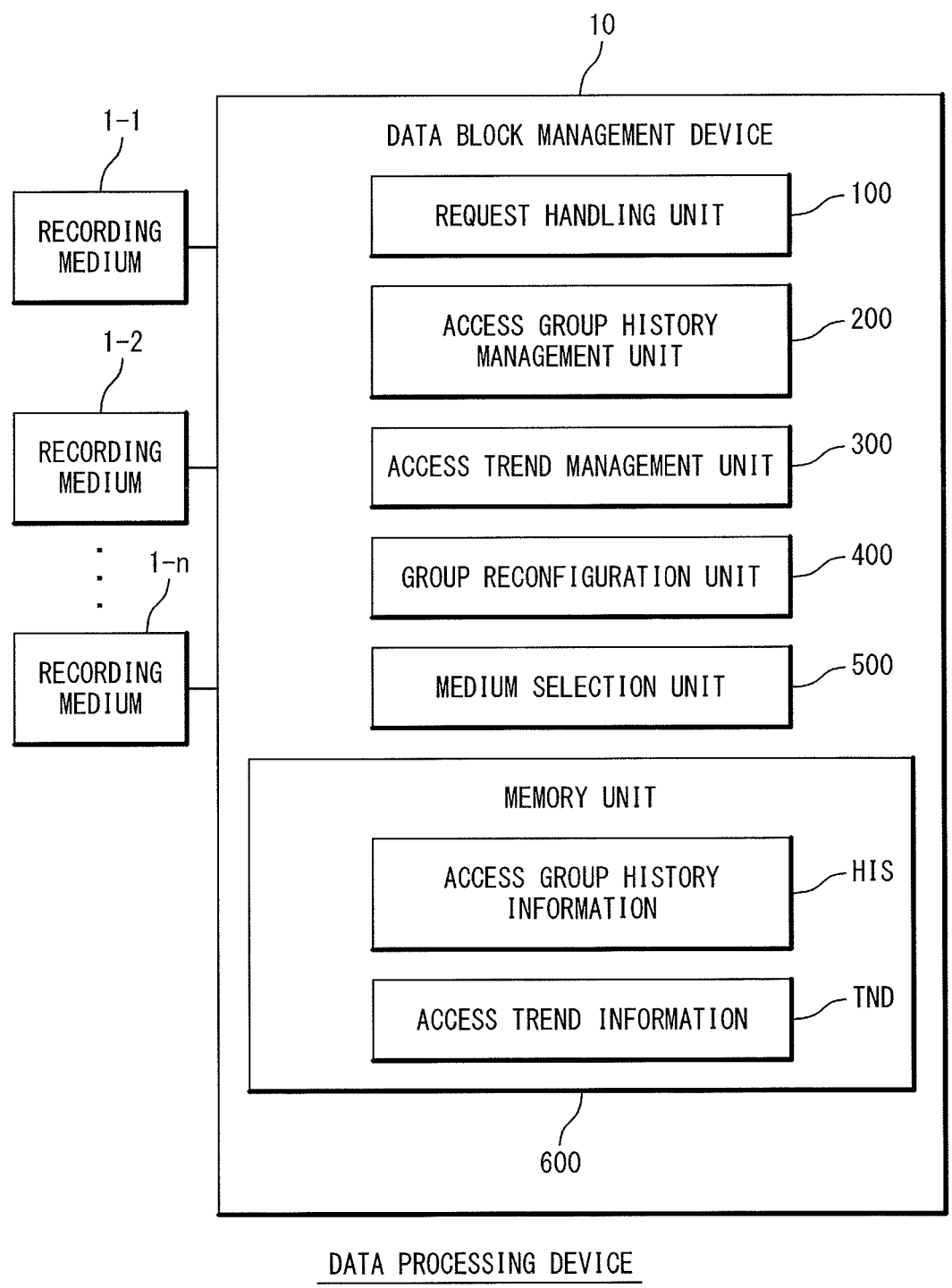
FIG. 2 is a block diagram showing a configuration of a data processing device according to an exemplary embodiment of the present invention.

Exemplary embodiments of the present invention will be described with reference to the attached drawings.

1. Outline

FIG. 1 conceptually shows plural kinds of recording media 1. Data is manipulated in units of a block (hereinafter referred to as a "data block"), and a plurality of data blocks are recorded on each recording medium 1. The plural kinds of recording media 1 are different from each other in access mechanism for the data block and thus characteristics. For example, the recording medium 1-1 is a solid state drive (SSD: Solid State Drive) capable of efficiently handling random accesses and the recording medium 1-2 is a hard disk drive (HDD: Hard Disk Drive) capable of efficiently handling sequential accesses.

In the case where the plural kinds of recording media are used, the recording medium on which the data block is recorded creates a big difference in access efficiency thereafter. For example, when there are a plurality of data blocks that are more likely to be accessed sequentially, it is preferable in terms of access efficiency to collectively record them on the HDD. Therefore, in the present exemplary embodiment, concept of "group (block group)" is introduced.

More specifically, the data blocks recorded on the plural kinds of recording media 1 are classified into a plurality of groups. Each group consists of at least one data block and is recorded on a designated one of the plural kinds of recording media 1. In FIG. 1, for example, the groups A and B are allocated to and recorded on the recording medium 1-1 (SSD). The groups C and D are allocated to and recorded on the recording medium 1-2 (HDD). It should be noted that such the classification and allocation can be realized by giving a group identifier and a medium identifier to each data block or preparing a correspondence table of the data blocks, the groups and the media.

Here, let us consider two successive accesses to the plural kinds of recording media 1. A group to which the data block accessed first belongs is hereinafter referred to as a "former group", and a group to which the data block accessed next is hereinafter referred to as a "latter group". In some cases, the former group and the latter group are different from each other, and in the other cases, they are the same. A case where the former group and the latter group are different from each other is hereinafter referred to as "group transition". That is, in the case of group transition, the former group and the latter group are different from each other and an access target group changes from the former group to the latter group. On the other hand, a case where the former group and the latter group are the same is hereinafter referred to as "group repetition". That is, in the case of group repetition, the former group and the latter group are the same and the access target group does not change.

In the present exemplary embodiment, an "access trend" with respect to the plurality of groups is monitored. The access trend, which means a trend of sequential access and a trend of random access, can be expressed by occurrence frequencies of the group transition and the group repetition. The group configuration is changed "dynamically" depending on the access trend. That is, reconfiguration of the groups is performed based on the access trend.

For example, let us consider a case where the group transition from the group A (former group) to the group B (latter group) currently recorded on the recording medium 1-1 (SSD) is frequently detected. This means that the sequential access from the group A to the group B becomes much more likely to occur. It is therefore preferable to collectively record the group A and the group B on the recording medium 1-2 (HDD) having the superior sequential access performance. To this end, the group A and the group B are integrated to generate one new group. Then, the new group is allocated to and recorded on the recording medium 1-2 (HDD). In this manner, the group reconfiguration is performed by integrating the groups.

Also for example, let us consider a case where the group repetition hardly occurs in the group C currently recorded on the recording medium 1-2 (HDD). This means that the sequential access becomes much less likely to occur in the group C. It is therefore preferable to divide the group C into parts and record the parts on the recording medium 1-1 (SSD) having the superior random access performance. To this end, the group C is divided to generate a plurality of new groups. Then, the new groups are allocated to and recorded on the recording medium 1-1 (SSD). In this manner, the group reconfiguration is performed by dividing the group.

According to the present exemplary embodiment, as described above, the group configuration is dynamically changed depending on the access trend with respect to the groups and each group is recorded on a suitable recording medium 1. As a result, efficiency of access to each data block is improved and thus data access speed is increased. That is, it is possible to achieve sufficient data access performance even when the plural kinds of recording media 1 are used. Moreover, it is also possible to suppress power consumption with achieving the sufficient data access performance, by appropriately incorporating a low power consumption one into the plural kinds of recording media 1.

2. Data Processing Device

FIG. 2 is a block diagram showing a configuration of a data processing device (computer system) that achieves the above-described processing. The data processing device has plural kinds of recording media 1-1 to 1-$n$ ($n$ is an integer equal to or more than 2) and a data block management device 10.

The recording medium 1 is a secondary storage device (auxiliary storage device) such as an HDD and an SSD. The plural kinds of recording media 1 are different from each other in access mechanism for the data block and thus characteristics. For example, the recording medium 1-1 is an SSD capable of efficiently handling random accesses and the recording medium 1-2 is an HDD capable of efficiently handling sequential accesses. The HDD has a higher sequential access efficiency and a lower random access efficiency as compared with the SSD.

The data block management device 10 has a CPU as an arithmetic processing unit and a RAM as a primary storage device (main storage device). The data block management device 10 performs data recording processing for the plural kinds of recording media 1. That is, the data block management device 10 classifies the data blocks recorded on the plural kinds of recording media 1 into a plurality of groups and records each group on a corresponding one of the plural kinds of recording media. It should be noted that the data recording processing according to the present exemplary embodiment is realized by the CPU of the data block management device 10 executing a computer program (data recording program). The computer program may be recorded on a computer-readable recording medium and read out from it.

More specifically, the data block management device 10 has a request handling unit 100, an access group history management unit 200, an access trend management unit 300, a group reconfiguration unit 400, a medium selection unit 500 and a memory unit 600, as shown in FIG. 2. The request handling unit 100, the access group history management unit 200, the access trend management unit 300, the group reconfiguration unit 400 and the medium selection unit 500 are realized by the CPU executing the computer program. Detailed functions of the respective units will be described later. The memory unit 600 corresponds to the primary storage device (RAM). Various information including access group history information HIS and access trend information TND is stored in the memory unit 600.

The access group history information HIS indicates a history of accesses to the data blocks recorded on the recording medium 1. More specifically, the access group history information HIS indicates a history of groups to which the accessed data blocks belong.

FIG. 3 shows an example of the access group history information HIS. The access group history information HIS indicates latest accessed k groups (k is an integer equal to or more than 2) and the numbers of accesses to the respective groups. In the example shown in FIG. 3, five entries associated with latest accessed five groups are provided (k=5). When group transition from a former group to a latter group occurs, a new entry with respect to the latter group is generated and the oldest existing entry is overwritten with the new entry. That is, the five entries are overwritten in turn as in a case of a ring buffer. The access group history information HIS further includes information about a beginning position and the number of entries not yet reflected. The beginning position indicates the latest entry number. In the example shown in FIG. 3, the beginning position=4 and the fourth entry is the latest entry. The number of entries not yet reflected is a counter that is increased every time a new entry is added. If the number of entries not yet reflected reaches a predetermined number, the information in the access group history information HIS not yet reflected is reflected in the access trend information TND. The details will be described later.

The access trend information TND indicates information related to the access trend (trend of sequential accesses and trend of random accesses). More specifically, the access trend information TND represents a trend of combinations of the former group and the latter group regarding two successive accesses.

FIG. 4 shows an example of the access trend information TND. The access trend information TND indicates the number of times (occurrence frequency) with respect to each of the combinations of the former group and the latter group. That is, the access trend information TND indicates a frequency distribution of various combinations of the former group and the latter group. It can also be said that the access trend information TND indicates the numbers of times (occurrence frequencies) of the "group transition" and the "group repetition". It should be noted that a plurality of entries having the same former group can exist as shown in FIG. 4. In other words, accesses from the same former group to various latter groups are possible. Furthermore, it is possible to set "others" as the latter group. The "others" means a set of plural groups that is not a certain one group. In the example shown in FIG. 4, the "others" means a set of all the groups other than the groups A, B and C.

3. Processing Flow

Figure 5:
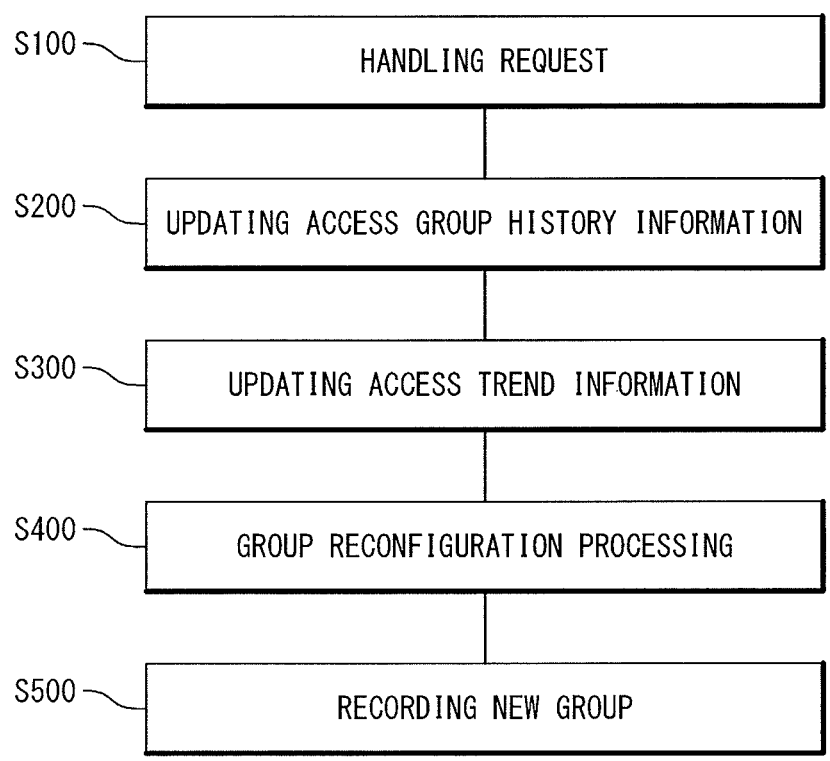
FIG. 5 is a flow chart showing processing by the data processing device according to the present exemplary embodiment.

Next, the processing by the data processing device according to the present exemplary embodiment will be described in detail. FIG. 5 shows an outline of the processing flow. The request handling unit 100 performs Step S100. The access group history management unit 200 performs Step S200. The access trend management unit 300 performs Step S300. The group reconfiguration unit 400 performs Step S400. The medium selection unit 500 performs Step S500. Each Step will be described below in detail.

3-1. Step S100

Figure 6:
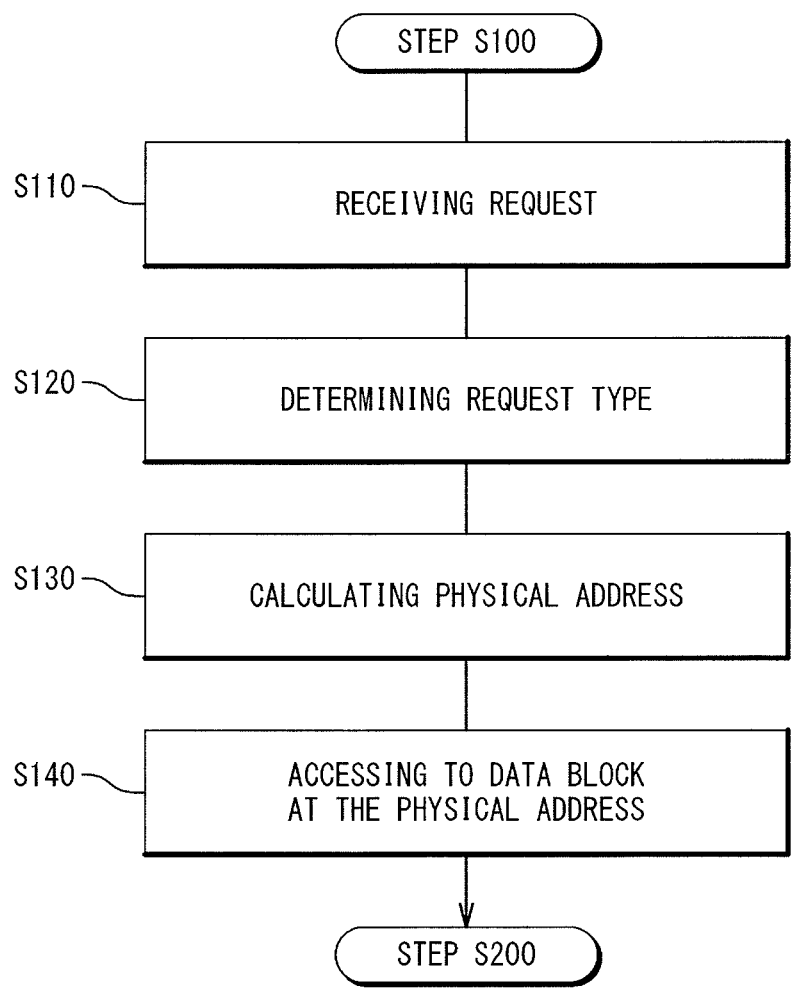
FIG. 6 is a flow chart showing processing in Step S100.

In Step S100, the request handling unit 100 handles a request with respect to the recording media 1. FIG. 6 is a flow chart showing processing in the Step S100.

Step S110:

The request handling unit 100 receives a request.

Step S120:

The request handling unit 100 determines a type (reference, update, creation, deletion) of the said request.

Step S130:

The request handling unit 100 calculates a physical address of a data block manipulation of which is requested by the said request. A common technique such as a page table is used for calculating the physical address.

Step S140:

The request handling unit 100 executes access processing (read, write) according to the request type for the data block at the calculated physical address. After that, the processing proceeds to Step S200.

3-2. Step S200

Figure 7:
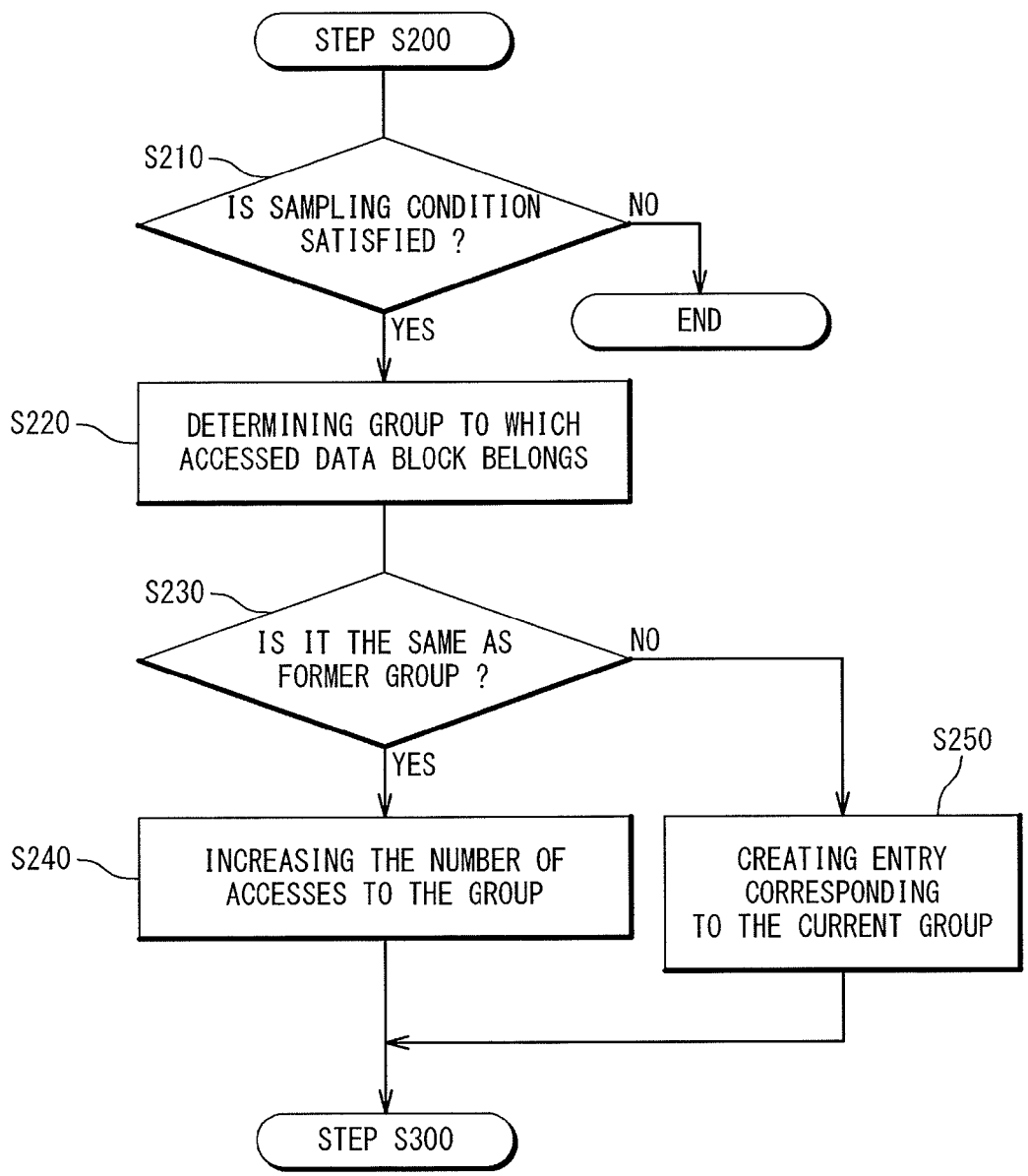
FIG. 7 is a flow chart showing processing in Step S200.

In Step S200, the access group history management unit 200 creates/updates the access group history information HIS (see FIG. 3). FIG. 7 is a flow chart showing processing in Step S200.

Step S210:

First, the access group history management unit 200 determines whether or not a predetermined sampling condition is satisfied as a result of the access to the data block in the Step S100. The sampling condition is exemplified by access to a data block different from the previous one, every 10 accesses, every second and so forth. If the sampling condition is satisfied, the processing proceeds to Step S220.

Step S220:

The access group history management unit 200 determines, based on the physical address calculated in the Step S100, a group to which the data block at the said physical address belongs. In another word, the access group history management unit 200 determines a group accessed this time. The determination function can be realized by giving a group identifier to each data block or preparing a correspondence table of the data blocks and the groups.

Step S230:

Next, the access group history management unit 200 determines whether the group accessed this time is the same as or different from the group accessed at the previous sampling time. That is, the access group history management unit 200 determines which of the "group repetition" and the "group transition" has occurred. The group previously accessed can be recognized from the latest entry indicated by the beginning position in the access group history information HIS.

Step S240:

If the accessed group is the same as the previous one, namely, in the case of the group repetition (Step S230; Yes), the access group history management unit 200 increases the number of accesses to the said same group. That is, the access group history management unit 200 increases the number of accesses indicated in the latest entry in the access group history information HIS. In this manner, the access group history information HIS is updated. After that, the processing proceeds to Step S300.

Step S250:

On the other hand, if the accessed group is different from the previous one, namely, in the case of the group transition (Step S230; No), the access group history management unit 200 creates a new entry corresponding to the current group and overwrites the oldest entry with the new entry. Furthermore, the access group history management unit 200 sets forward the beginning position and increases the number of entries not yet reflected by 1. In this manner, the access group history information HIS is updated. After that, the processing proceeds to Step S300.

3-3. Step S300

Figure 8:
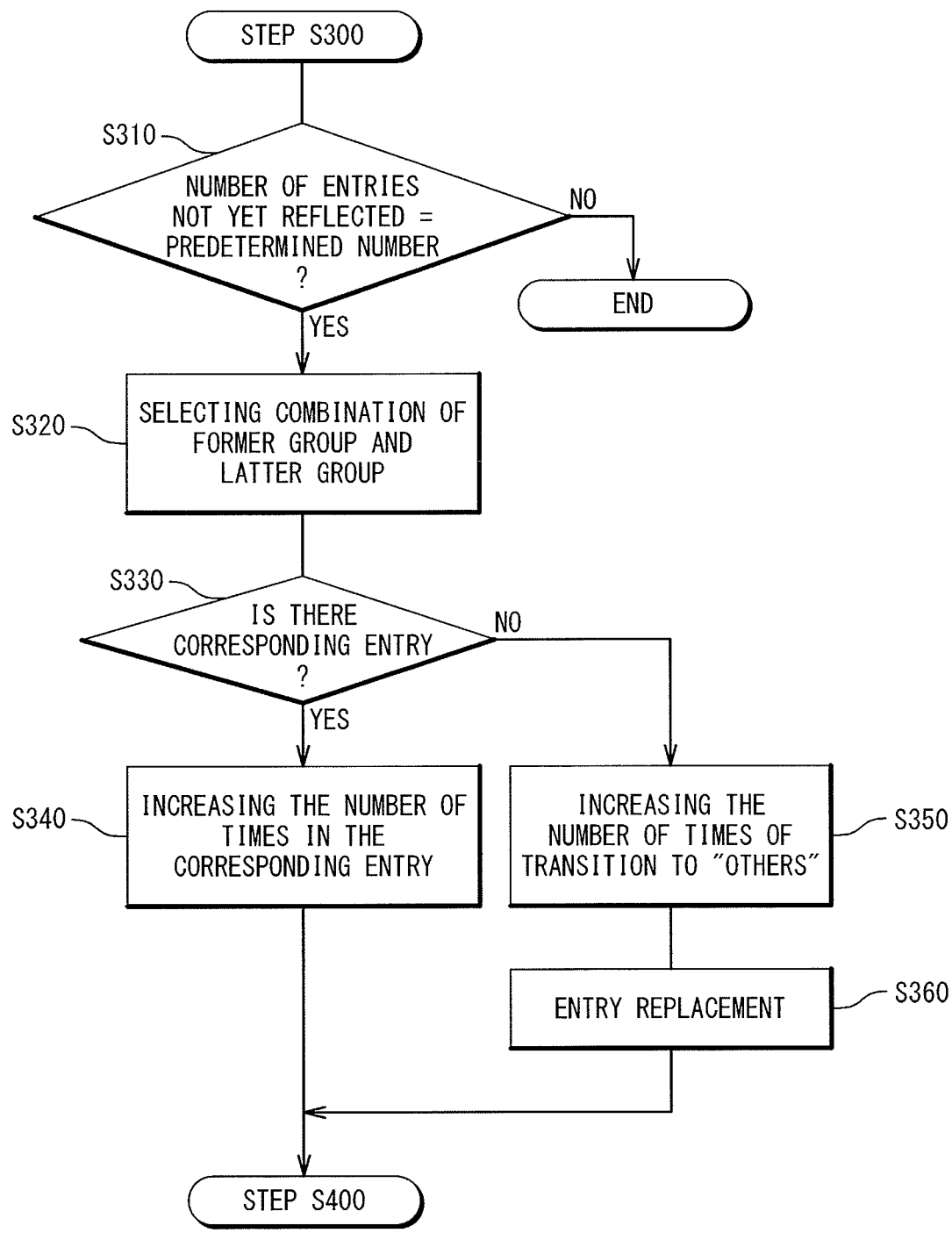
FIG. 8 is a flow chart showing processing in Step S300.

In Step S300, the access trend management unit 300 creates/updates the access trend information TND (see FIG. 4). FIG. 8 is a flow chart showing processing in Step S300.

Step S310:

The access trend management unit 300 refers to the above-mentioned access group history information HIS to check whether or not the number of entries not yet reflected reaches a predetermined number. For example, a total number of entries included in the access group history information HIS is k and the predetermined number is (k−1). If the condition is satisfied (Step S310; Yes), the processing proceeds to Step S320.

Step S320:

The access trend management unit 300 refers to the access group history information HIS to recognize a history of the group repetitions and the group transitions indicated by the entries not yet reflected. Then, the access trend management unit 300 selects the group repetitions and the group transitions in turn, namely, selects one by one the combinations of the former group and the latter group. The following Steps S330 to S360 are performed with respect to each selected combination. After the following Steps S330 to S360 are performed with respect to all the combinations, the number of entries not yet reflected is initialized to 0.

Step S330:

The access trend management unit 300 checks whether or not an entry indicating the combination selected in the Step S320 already exists in the access trend information TND.

Step S340:

If the appropriate entry exists in the access trend information TND (Step S330; Yes), the access trend management unit 300 increases the number of times in the entry (i.e. the number of times of the group repetition or the group transition). In this manner, the access trend information TND is updated. After that, the processing proceeds to Step S400.

Step S350:

On the other hand, if there is no appropriate entry in the access trend information TND (Step S330; No), the access trend management unit 300 increases the number of times of the group transition from the former group to the "others". In this manner, the access trend information TND is updated.

Step S360:

If the number of times or a ratio of the group transition to the "others" exceeds a predetermined value, entry replacement is performed. For example, (1) an entry with the smallest number of times of the group transition is deleted, (2) the latter group in the deleted entry is added to the "others", (3) another group is selected and deleted from the "others", and (4) a new entry in which the selected group is set as the latter group is added. After that, the processing proceeds to Step S400.

3-4. Step S400

Figure 9:
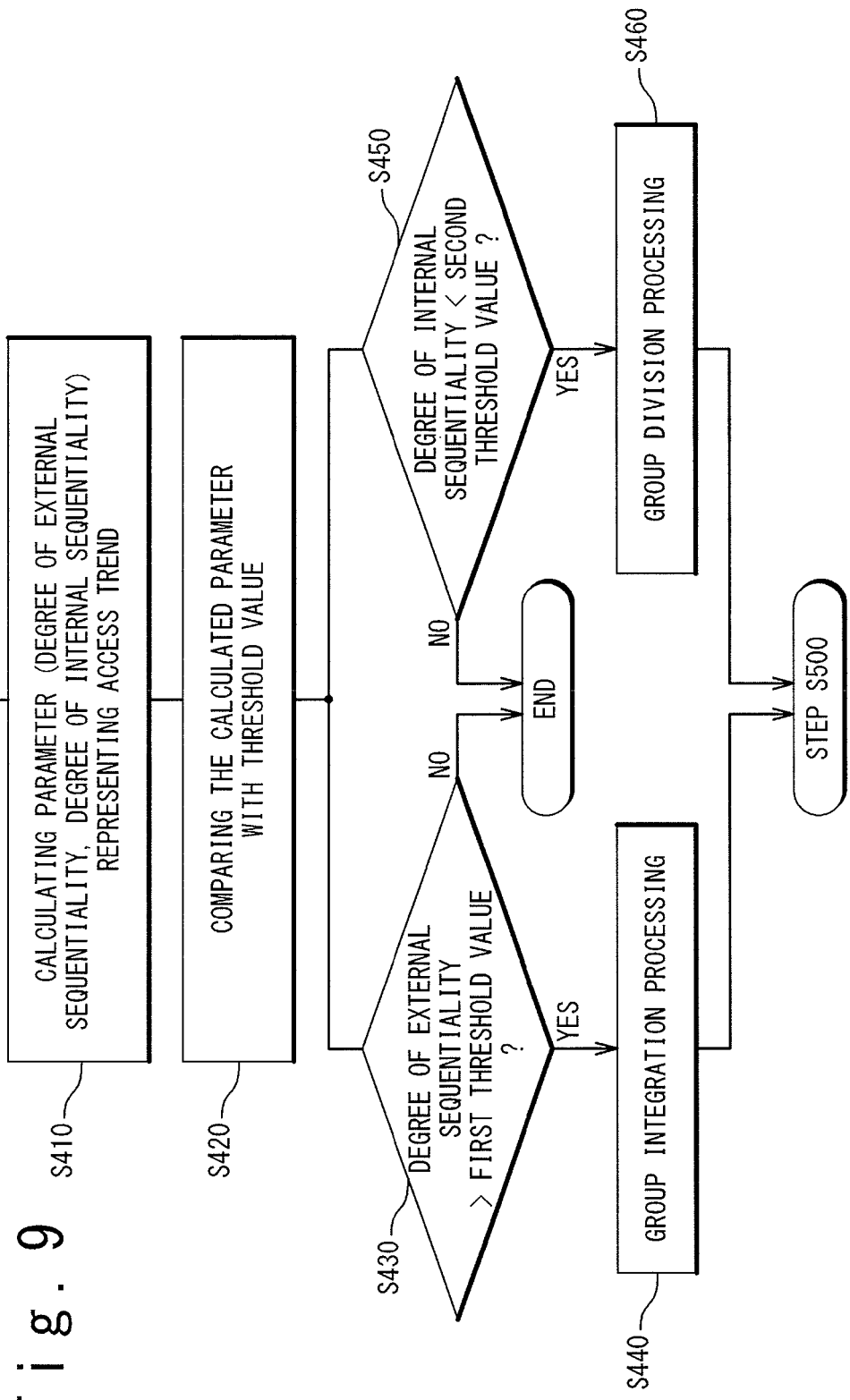
FIG. 9 is a flow chart showing processing in Step S400.

In Step S400, the group reconfiguration unit 400 performs "group reconfiguration processing" by reference to the above-mentioned access trend information TND. FIG. 9 is a flow chart showing processing in Step S400.

Step S410:

The group reconfiguration unit 400 refers to the access trend information TND to calculate a parameter representing the access trend. The parameter representing the access trend includes "degree of external sequentiality" and "degree of internal sequentiality".

The degree of external sequentiality is a parameter representing a trend of sequential access between two different groups and relates to the group transition where the former group and the latter group are different from each other. Here, let us consider a first group as the former group and a second group as the latter group different from the first group. The number of times of the group transition from the first group to the second group is T12. In this case, the degree of external sequentiality regarding the first group and the second group is a parameter that increases as the number of transition times T12 increases and decreases as the number of transition times T12 decreases. For example, the degree of external sequentiality regarding the first group and the second group is defined as a ratio of the number of transition times T12 to a total number of transition times T1A (=T12/T1A). Here, the total number of transition times T1A is a total number of times of the group transition where the former group is the first group and the latter group is other than the first group.

It should be noted that the degree of external sequentiality may be calculated with respect to only a combination of the former group and the latter group where the number of transition times is the maximum. Alternatively, the degree of external sequentiality may be calculated with respect to some of or all of the combinations of the former group and the latter group.

The degree of internal sequentiality is a parameter representing a trend of sequential access within a certain one group and relates to the group repetition where the former group and the latter group are the same. Here, let us consider a third group as the former group and the latter group of the group repetition. The number of times of the group repetition of the third group is R33. In this case, the degree of internal sequentiality regarding the third group is a parameter that increases as the number of repetition R33 increases and decreases as the number of repetition R33 decreases. For example, the degree of internal sequentiality regarding the third group is defined as a ratio of the number of repetition R33 to a total number of times R3A (=R33/R3A). Here, the total number of times R3A is a sum of the number of times of the group repetition and the number of times of the group transition where the former group is the third group.

Step S420:

The group reconfiguration unit 400 compares the parameter calculated in the Step S410 with a predetermined threshold value. More specifically, the group reconfiguration unit 400 compares the degree of external sequentiality with a first threshold value. Also, the group reconfiguration unit 400 compares the degree of internal sequentiality with a second threshold value. As a result of the comparisons, "group integration" and/or "group division" may be performed.

Steps S430 and S440:

If the degree of external sequentiality exceeds the first threshold value (Step S430; Yes), the group reconfiguration unit 400 executes group integration processing (Step S440). More specifically, the group reconfiguration unit 400 integrates the first group and the second group whose degree of external sequentiality exceeds the first threshold value, to generate a new group.

Furthermore, the group reconfiguration unit 400 updates the access trend information TND according to the result of the group integration. For example, let us consider a case where a new group E is generated by integration of a group A and a group B. In this case, the group A and the group B in the access trend information TND all are replaced by the group E. As a result, overlapping entries having the same combination of the former group and the latter group may be generated. In this case, the numbers of times in the respective overlapping entries are combined and the overlapping entries are integrated to one entry. After that, the processing proceeds to Step S500.

Steps S450 and S460:

If the degree of internal sequentiality falls below the second threshold value (Step S450; Yes), the group reconfiguration unit 400 executes group division processing (Step S460). More specifically, the group reconfiguration unit 400 divides the third group whose degree of internal sequentiality falls below the second threshold value, to generate a plurality of new groups. Here, the numbers of blocks included in the respective new groups generated are the same or almost the same.

Furthermore, the group reconfiguration unit 400 updates the access trend information TND according to the result of the group division. For example, let us consider a case where two new groups E and F are generated by division of a group A. In this case, an entry where the former group or the latter group is the group A is divided into two new entries, the group A in one new entry is changed to the group E, and the group A in the other new entry is changed to the group F. Moreover, the number of times in the original entry is evenly divided or almost evenly divided and then distributed to the two new entries. After that, the processing proceeds to Step S500.

In the other cases (Step S430; No, Step S450; No), the processing is ended.

3-5. Step S500

Figure 10:
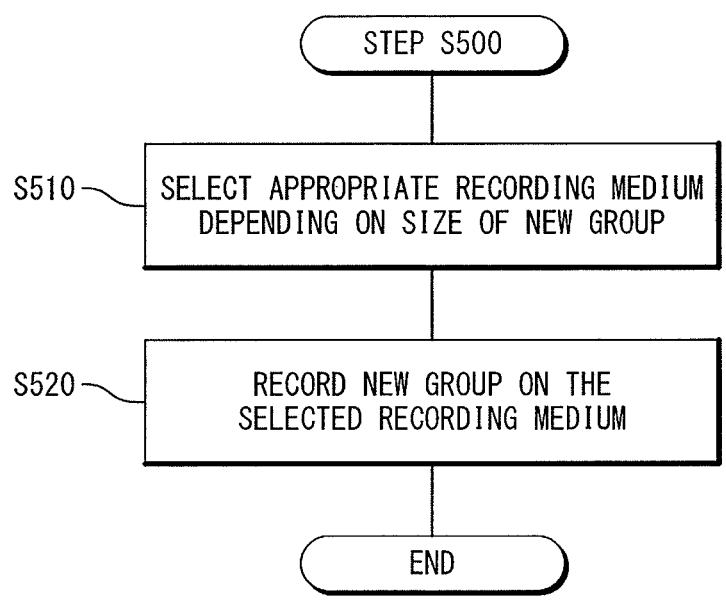
FIG. 10 is a flow chart showing processing in Step S500.

In Step S500, the medium selection unit 500 records the new group obtained as a result of the above-described Step S400 on a corresponding one of the plural kinds of recording media 1. FIG. 10 is a flow chart showing processing in Step S500.

Step S510:

The medium selection unit 500 selects, depending on a size (data amount) of the new group, a suitable recording medium 1 on which the new group is to be recorded. For example, if the size of the new group becomes larger than a predetermined size threshold value as a result of the group integration, the medium selection unit 500 selects the recording medium 1-2 (HDD) suitable for the sequential access. On the other hand, if the size of the new group becomes smaller than the predetermined size threshold value as a result of the group division, the medium selection unit 500 selects the recording medium 1-1 (SSD) suitable for the random access.

Step S520:

The medium selection unit 500 records the new group on a continuous region or close regions of the suitable recording medium 1 selected in the Step S510.

4. Concrete Example

A concrete example of the processing according to the present exemplary embodiment will be described hereinafter.

Figure 11:
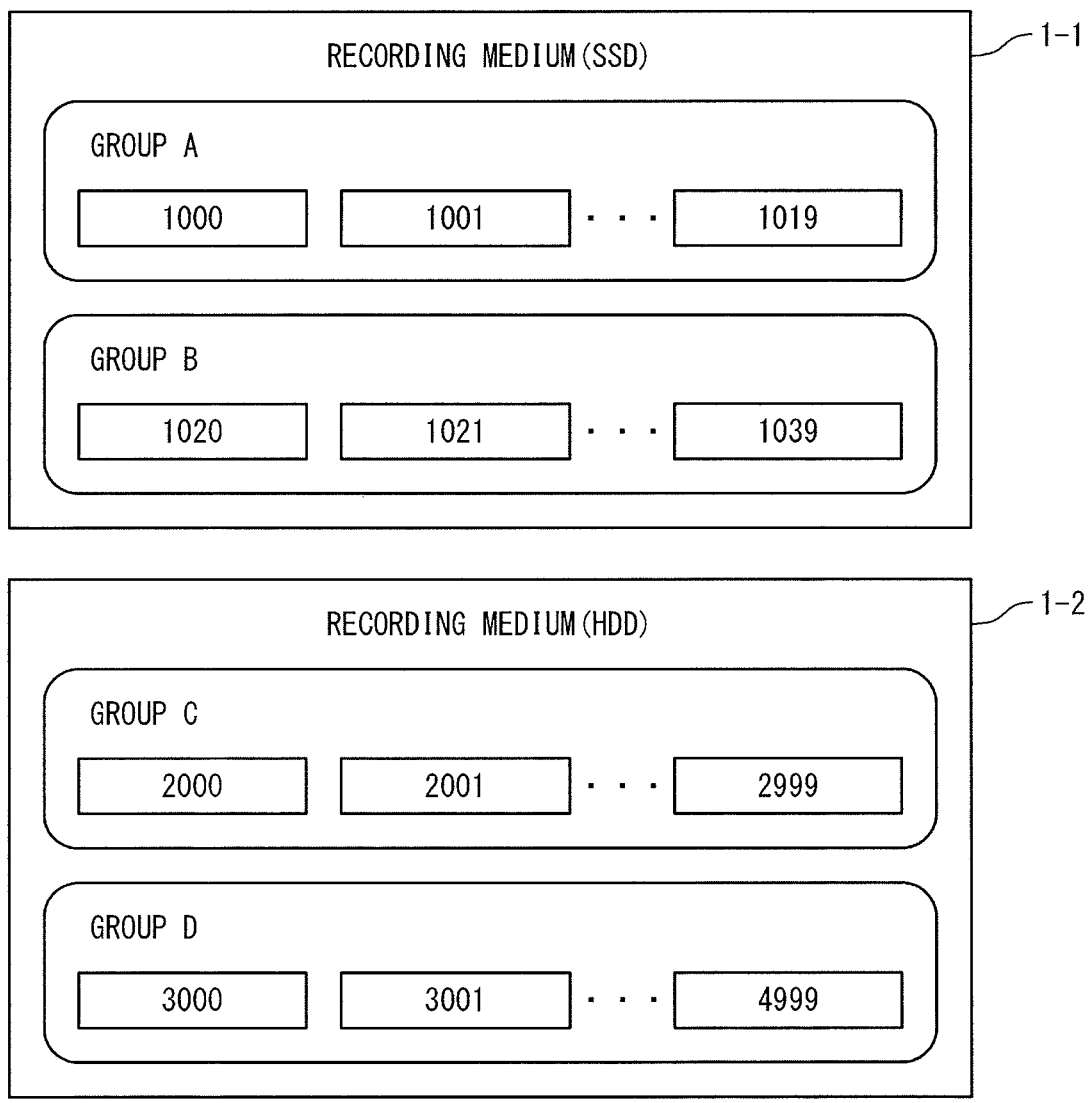
FIG. 11 shows an example of plural kinds of recording media.

Let us consider a case shown in FIG. 11. The recording medium 1-1 is an SSD, and groups A and B are recorded on the recording medium 1-1. The group A includes data blocks 1000 to 1019 and the group B includes data blocks 1020 to 1039. The recording medium 1-2 is an HDD, and groups C and D are recorded on the recording medium 1-2. The group C includes data blocks 2000 to 2999 and the group D includes data blocks 3000 to 4999.

Figure 12:
FIG. 12 shows an example of the access group history information.

FIG. 12 shows the access group history information HIS. The beginning position is 2 and the number of entries not yet reflected is 3. That is, accesses have occurred in an order of group C-A-B-D-A and accesses to the latest groups B-D-A are not yet reflected.

FIG. 13 shows the access trend information TND. For simplicity, only entries where the former group is the group A are illustrated. The number of times of repetition within the group A is 45. The number of times of transition from the group A to the group B is 5. The number of times of transition from the group A to the "others" is 3.

Step S100:

Subsequently, reference to the data block 1020 is requested. The request handling unit 100 handles the said request.

Figure 14:
FIG. 14 shows the access group history information after update.

Step S200:

The access group history management unit 200 determines that the accessed data block 1020 belongs to the group B (Step S220). According to the access group history information HIS shown in FIG. 12, the previously accessed group is the group A and different from the currently accessed group B (Step S230; No). That is, the group transition from the group A to the group B has occurred. Therefore, the access group history management unit 200 updates the access group history information HIS as shown in FIG. 14 (Step S250). As shown in FIG. 14, the beginning position is updated to 3 and the number of entries not yet reflected is updated to 4. A new entry associated with the group B is generated at the beginning position.

Step S300:

Since the number of entries not yet reflected (=4) has reached the predetermined number (Step S310; Yes), the access trend management unit 300 updates the access trend information TND. In the present example, the accesses to the latest groups B-D-A-B are not yet reflected and they are reflected in the access trend information TND. For simplicity, reflecting the group repetition and group transition with respect to the group A in the access trend information TND will be described here. As shown in FIG. 14, the access to the group A has occurred three times and then the group transition from the group A to the group B has occurred. Thus, the access trend information TND shown in FIG. 13 is updated as shown in FIG. 15. The number of times of repetition within the group A is increased by 3 to 48, and the number of times of transition from the group A to the group B is increased by 1 to 6 (Step S340). After that, the number of entries not yet reflected in the access group history information HIS is initialized to 0.

Step S400:

The group reconfiguration unit 400 calculates the degree of external sequentiality and the degree of internal sequentiality by reference to the access trend information TND (Step S410). Referring to FIG. 15, the degree of external sequentiality regarding the group A and the group B is calculated to be 6/(6+3)=2/3. Moreover, the degree of internal sequentiality regarding the group A is calculated to be 48/(48+6+)=16/19.

Here, let us consider a case where the first threshold value with respect to the degree of external sequentiality is 5/8. In this case, the calculated degree of external sequentiality (=2/3) exceeds the first threshold value (=5/8) (Step S430; Yes). Therefore, the group reconfiguration unit 400 performs the group integration processing (Step S440). More specifically, the group reconfiguration unit 400 integrates the group A and the group B to generate a new group E and updates the access trend information TND.

FIG. 16 shows the access trend information TND after the group integration processing. The group A and the group B in the access trend information TND all are replaced by the group E. For example, an entry "former group=E, latter group=E" is a result of integration of an entry "former group=A, latter group=A", an entry "former group=A, latter group=B", an entry "former group=B, latter group=B" and an entry "former group=B, latter group=A". Also, an entry "former group=C, latter group=E" is a result of integration of an entry "former group=C, latter group=A" and an entry "former group=C, latter group=B".

Step S500:

The new group E obtained as a result of the group integration includes the data blocks 1000 to 1039 and its size (the number of blocks) becomes 40. If the size threshold value is 30, the size of the new group E is larger than the size threshold value. In this case, the medium selection unit 500 selects the recording medium 1-2 (HDD) suitable for the sequential access as the recording medium 1 on which the new group E is to be recorded. Then, the medium selection unit 500 records the new group E on the recording medium 1-2 (HDD).

5. Effects

According to the present exemplary embodiment, as described above, the group configuration is dynamically changed depending on the access trend with respect to the groups and each group is recorded on a suitable recording medium 1. As a result, efficiency of access to each data block is improved and thus data access speed is increased. That is, it is possible to achieve sufficient data access performance even when the plural kinds of recording media 1 are used. Moreover, it is also possible to suppress power consumption with achieving the sufficient data access performance, by appropriately incorporating a low power consumption one into the plural kinds of recording media 1.

The present invention can be applied to an online storage, a data warehouse, an unstructured database and the like handling a large amount of data.

While the exemplary embodiments of the present invention have been described above with reference to the attached drawings, the present invention is not limited to these exemplary embodiments and can be modified as appropriate by those skilled in the art without departing from the spirit and scope of the present invention.

This application is based upon and claims the benefit of priority from Japanese patent application No. 2009-187229, filed on Aug. 12, 2009, the disclosure of which is incorporated herein in its entirely by reference.

The invention claimed is:

1. A data processing device comprising:
plural kinds of recording media; and
a data block management device configured to classify data blocks recorded on said plural kinds of recording media into a plurality of groups and to record each of said plurality of groups on a corresponding one of said plural kinds of recording media,
wherein said data block management device performs group reconfiguration processing based on a trend of accesses to said plurality of groups and records a new group obtained as a result of said group reconfiguration processing on a corresponding one of said plural kinds of recording media,
wherein in said group reconfiguration processing,
if a first parameter representing a trend of sequential access between two different groups exceeds a first threshold value, said data block management device integrates said two different groups to generate said new group, and
if a second parameter representing a trend of sequential access within a certain group falls below a second threshold value, said data block management device divides said certain group to generate said new group.

2. The data processing device according to claim 1,
wherein regarding two successive accesses to said plural kinds of recording media, a former group is defined as a group to which a data block accessed first belongs, and a latter group is defined as a group to which a data block accessed next belongs,
wherein said data block management device comprises:
a memory unit in which access trend information representing a trend of combinations of said former group and said latter group is stored;
a group reconfiguration unit configured to perform said group reconfiguration processing by reference to said access trend information; and
a medium selection unit configured to record said new group obtained as a result of said group reconfiguration processing on a corresponding one of said plural kinds of recording media,
wherein in said group reconfiguration processing,
if said first parameter exceeds said first threshold value, said group reconfiguration unit integrates said two different groups to generate said new group, and
if said second parameter falls below said second threshold value, said group reconfiguration unit divides said certain group to generate said new group.

3. The data processing device according to claim 2,
wherein said access trend information indicates an occurrence frequency with respect to each of the combinations of said former group and said latter group.

4. The data processing device according to claim 3,
wherein group repetition means that said former group and said latter group are the same and an access target group is the same,
wherein said former group and said latter group are a same third group,
said second parameter regarding said third group is defined as degree of internal sequentiality that increases as a number of times of said group repetition of said third group increases, and
wherein if said degree of internal sequentiality falls below said second threshold value, said group reconfiguration unit divides said third group to generate said new group.

5. The data processing device according to claim 4,
wherein a number of times of said group repetition of said third group is a first number of repetition times,
a total number of the occurrence frequency where said former group is said third group is a total number of times, and
said degree of internal sequentiality is defined as a ratio of said first number of repetition times to said total number of times.

6. The data processing device according to claim 3,
wherein group transition means that said former group and said latter group are different from each other and an access target group changes,
wherein said former group is a first group,
said latter group is a second group different from said first group,
said first parameter regarding said first group and said second group is defined as degree of external sequentiality that increases as a number of times of said group transition from said first group to said second group increases, and
wherein if said degree of external sequentiality exceeds said first threshold value, said group reconfiguration unit integrates said first group and said second group to generate said new group.

7. The data processing device according to claim 6,
wherein a number of times of said group transition from said first group to said second group is a first number of transition times,
a total number of times of said group transition where said former group is said first group is a total number of transition times, and
said degree of external sequentiality is defined as a ratio of said first number of transition times to said total number of transition times.

8. The data processing device according to claim 2,
wherein said medium selection unit selects, depending on a size of said new group, a recording medium on which said new group is recorded from said plural kinds of recording media.

9. The data processing device according to claim 8,
wherein said plural kinds of recording media includes:
a first recording medium; and
a second recording medium having a higher sequential access efficiency and a lower random access efficiency as compared with said first recording medium,
wherein if the size of said new group is smaller than a predetermined size threshold value, said medium selection unit selects said first recording medium, and
wherein if the size of said new group is larger than said predetermined size threshold value, said medium selection unit selects said second recording medium.

10. The data processing device according to claim 9,
wherein said first recording medium is a solid state drive; and
said second recording medium is a hard disk drive.

11. The data processing device according to claim 2,
wherein access group history information indicating a history of groups to which accessed data blocks belong is further stored in said memory unit,
wherein said data block management device further comprises:
an access group history management unit configured to update said access group history information in response to an access to said plural kinds of recording media; and
an access trend management unit configured to update said access trend information by reference to said access group history information.

12. A method of recording data on plural kinds of recording media, comprising:
classifying data blocks recorded on said plural kinds of recording media into a plurality of groups;
recording each of said plurality of groups on a corresponding one of said plural kinds of recording media;
performing group reconfiguration processing; and
recording a new group obtained as a result of said group reconfiguration processing on a corresponding one of said plural kinds of recording media,
wherein regarding two successive accesses to said plural kinds of recording media, a former group is defined as a group to which a data block accessed first belongs, and a latter group is defined as a group to which a data block accessed next belongs,
wherein said group reconfiguration processing comprises:
reading access trend information representing a trend of combinations of said former group and said latter group, from a memory device;
referring to said access trend information and, if a first parameter representing a trend of sequential access between two different groups exceeds a first threshold value, integrating said two different groups to generate said new group; and
referring to said access trend information and, if a second parameter representing a trend of sequential access within a certain group falls below a second threshold value, dividing said certain group to generate said new group.

13. A recording medium on which a data recording program is recorded,
wherein said data recording program causes a computer to execute data recording processing for plural kinds of recording media,
wherein said data recording processing comprises:
classifying data blocks recorded on said plural kinds of recording media into a plurality of groups;
recording each of said plurality of groups on a corresponding one of said plural kinds of recording media;
performing group reconfiguration processing; and
recording a new group obtained as a result of said group reconfiguration processing on a corresponding one of said plural kinds of recording media,
wherein regarding two successive accesses to said plural kinds of recording media, a former group is defined as a group to which a data block accessed first belongs, and a latter group is defined as a group to which a data block accessed next belongs,
wherein said group reconfiguration processing comprises:
reading access trend information representing a trend of combinations of said former group and said latter group, from a memory device;
referring to said access trend information and, if a first parameter representing a trend of sequential access between two different groups exceeds a first threshold value, integrating said two different groups to generate said new group; and
referring to said access trend information and, if a second parameter representing a trend of sequential access within a certain group falls below a second threshold value, dividing said certain group to generate said new group.

* * * * *

UNITED STATES PATENT AND TRADEMARK OFFICE
CERTIFICATE OF CORRECTION

PATENT NO. : 8,868,853 B2  Page 1 of 1
APPLICATION NO. : 13/390030
DATED : October 21, 2014
INVENTOR(S) : Shigero Sasaki It is certified that error appears in the above-identified patent and that said Letters Patent is hereby corrected as shown below:

In the Specification,

Column 13, Line 11: Delete "48/(48+6+)" and insert -- 48/(48+6+3) --

Signed and Sealed this
Seventeenth Day of March, 2015

Michelle K. Lee
*Director of the United States Patent and Trademark Office*